United States Patent
Rodriguez (10) Patent No.: US 6,691,913 B1
(45) Date of Patent: Feb. 17, 2004

(54) SELF SEALING CONTAINERS

(76) Inventor: Luis J. Rodriguez, 60 Fourth St., South Orange, NJ (US) 07079-1851

( * ) Notice: Subject to any disclaimer, the term of this patent is extended or adjusted under 35 U.S.C. 154(b) by 27 days.

(21) Appl. No.: 09/978,264

(22) Filed: Oct. 15, 2001

Related U.S. Application Data (60) Division of application No. 09/130,534, filed on Aug. 4, 1998, now Pat. No. 6,406,586, which is a continuation-in-part of application No. 09/093,301, filed on Jun. 8, 1998, now abandoned, which is a continuation-in-part of application No. 08/986,394, filed on Dec. 8, 1997, now abandoned.

(51) Int. Cl.⁷ .............................. B65D 27/16; B65D 5/66
(52) U.S. Cl. ....................... 229/246; 229/80.5
(58) Field of Search ........................ 229/80, 80.5, 245, 229/246

(56) References Cited

U.S. PATENT DOCUMENTS

| | | | |
|---|---|---|---|
| 2,099,166 A | * 11/1937 | Inman et al. | 229/245 |
| 2,133,946 A | * 10/1938 | Bloomer | 229/245 |
| 3,900,642 A | 8/1975 | Michel | |
| 4,066,206 A | 1/1978 | Peterson | |
| 4,460,634 A | 7/1984 | Hasegawa | |
| 4,738,391 A | 4/1988 | Wiseman | |
| 4,903,844 A | 2/1990 | Oglesby | |
| 4,915,288 A | 4/1990 | Kao et al. | |
| 4,928,875 A | 5/1990 | Hutchinson | |
| 5,044,766 A | 9/1991 | Schramer et al. | |
| 5,194,299 A | 3/1993 | Fry | |
| 5,499,757 A | 3/1996 | Back | |
| 5,573,277 A | 11/1996 | Petkovsek | |
| 5,687,903 A | 11/1997 | Akridge et al. | |
| 5,687,904 A | 11/1997 | Potter | |
| 5,711,477 A | 1/1998 | Jenkins | |
| 5,713,511 A | 2/1998 | Diamond | |
| 5,722,585 A | 3/1998 | Redl | |
| 5,738,274 A | 4/1998 | Stude | |
| 5,743,462 A | 4/1998 | Stone | |

FOREIGN PATENT DOCUMENTS

| | | | |
|---|---|---|---|
| FR | 2749828 | * | 12/1997 |
| WO | WO 90/11943 | | 10/1990 |

* cited by examiner

*Primary Examiner*—Lee Young
*Assistant Examiner*—Joseph C. Merek (57) ABSTRACT

Readily sealable containers which do not require the moistening of dry adhesive layers or the use of removable release liners to protect pressure sensitive adhesive layers. Although the containers may have many applications and uses, they have particular advantages for shipping and mailing purposes. Thus, envelopes and shipping boxes are notable embodiment examples. In general terms, two facing sections of the container have layers of an adhesive substance and a release substance, arranged in such a manner that when the two facing sections are in contact with one another, the adhesive substance layers face the release substance, preventing a permanent sealing of the container, and then, the positioning of another section of the container, free of any adhesive or release substance between the two facing sections, which causes the sealing of the container.

28 Claims, 8 Drawing Sheets

SELF SEALING CONTAINERS

CROSS REFERENCE TO RELATED APPLICATIONS

This is a divisional of Ser. No. 09/130,534, now U.S. Pat. No. 6,406,586, filed Aug. 4, 1998, which is a continuation-in-part of Ser. No. 09/093,301 filed Jun. 8, 1998, now abandoned, which is a continuation-in-part of Ser. No. 08/986,394, filed Dec. 8, 1997, now abandoned.

BACKGROUND

1. Field of the Invention

This invention relates to containers, particularly to such containers that can be readily self sealed, and that do not require the moistening of dry adhesive layers, or the additional production, mounting and subsequent removal of protective release liners, or the use of adhesive tape for fastening.

BACKGROUND

2. Description of Prior Art

A conventional system to seal envelopes, bags, boxes, packaging, etc. uses a dry glue coating that needs to be moistened to promote adhesion of the surfaces involved. Depending on the scale and nature of each task, this moistening is normally achieved by different means, including the use of wet sponges, roll-on bottles with water, and the actual licking of the dry glue with the user's tongue. Regardless of the means used, the need to moisten a dry adhesive coating is precisely the first disadvantage of this system. Also the implementation of this system to seal envelopes is highly challenged by the high temperatures used by roller friction printers which in many cases cause an undesirable premature fastening of the envelope.

Other systems involve the use of heat, and/or delamination of different coatings of adhesive, with the inherent disadvantages that such steps entail. An example of this system is U.S. Pat. No. 3,877,630 to Silver for a "Method and blank for forming a package within a wrapping". In recent years, the inconveniences of these archaic systems have prompted different attempts to create a more practical solution, but the success of these attempts has been very relative, since new inconveniences are created in the process.

One of these systems requires two opposite coatings of dry glue (normally rubber cement like) that when contacting one another, the envelope, packaging, box etc. is sealed, eliminating thereby the need to moisten the coating. These are some disadvantages of this system:

1) A higher cost is apparent, since two coatings of glue are necessary.
2) These coatings are exposed at all times, risking the good bonding quality of the glue.
3) The impediment to feed envelopes through machines, such as printers, since the glue and the parts of said machines will disturb each other.
4) The piece must remain unfastened before its use, occupying therefore more shelf or floor space during packaging, storage and display.

Another system uses a pressure sensitive adhesive coating on one of the surfaces that need to be fastened. This pressure sensitive coating is protected with a paper, plastic or synthetic liner carrying a release substance before its use. An example of this system is an envelope manufactured and marketed by Mead Corp. of Dayton, Ohio, under the name of Press it-Seal it™ (Product#43100 75024.)

This system does eliminate the need to moisten the adhesive coating, yet it has its own significant disadvantages:

1) There is an obvious higher cost of production, since foreign parts and additional production steps are required.
2) The presence of this foreign liner may prevent the capability of envelopes and other flat objects to be fed through printers or other machines.
3) The user needs to incur in the additional steps of peeling and disposing of this foreign liner.

Some other examples of this system, having the same disadvantages include: U.S. Pat. No. 3,130,895 to Davis for a book mailer; U.S. Pat. No. 3,306 521 to Giacovas for self sealing paperboard cartons; U.S. Pat. No. 5,499,757 to Back for a tamper-evident envelope which proposes as an alternative embodiment, the use of the pressure sensitive adhesive coupled with the release liner and additionally, having said arrangement mounted on the two surfaces that are being connected, which aggravates the aforementioned disadvantages; U.S. Pat. No. 5,722,585 tp Redl, which discloses the use of a protective strip in cooperation with an adhesive strip, to seal a box after the box has been closed using a tongue-and-slit mechanism. The operability of this system appears questionable, or at least its functionability is highly deficient. Since the patent does not disclose the protective strip's properties, and the removal of the protective strips must me performed in a lateral fashion, being trapped between the cover and the flaps, two scenarios must be considered, and both scenarios present problems:

1) if the protective strips do not fasten—however lightly—to the adhesive strips, it will be very difficult to mount them, and even more difficult to keep them in place.
2) if the protective strips do fasten—however lightly—to the adhesive strips, pulling them out laterally, as disclosed will be extremely difficult, if not impossible, since the necessary direction of removal will have to be of a frontal nature, which is prevented by the cover.

U.S. Pat. No. 4,072,264 to Kranz discloses a duplex envelope that in one of its double aspects requires a removable release liner to protect a coating of pressure sensitive adhesive entailing additional expenses and impracticalities.

U.S. Pat. No. 4,738,391 to Wiseman discloses an envelope that can be temporarily or permanently sealed. To that end, Wiseman proposes two procedures that make the product somewhat complicated and expensive, as depends on both systems already discussed: a) the need to moisten a dry adhesive coating; and b) the need to use removable release liners.

U.S. Pat. No. 5,429,576 to Doderer-Winkler discloses a reusable envelope that needs a removable release liner to protect a coating of adhesive on a flap, and then a protective strip of tape on the body of the envelope to permit the temporary sealing of the envelope, so it can be repeatedly used. These multiple and complex steps suggest that this product is very expensive to manufacture.

U.S. Pat. No. 5,474,229 to Shimazaki proposes a stack of pressure sensitive adhering envelopes, having on the back of each flap a coating of release, and on the front a coating of adhesive, so that when the envelopes are stacked with the flaps open, the adhering interface between the pressure sensitive adhesive and the release is not permanent and each envelope could be sealed without having to moisten the adhesive.

The following are problems and limitations of this system:
1) The need to package and sell the envelopes in quantities. Individual envelopes could not be marketed. Or to be marketed, a release liner must be used, which defeats the purpose of Shimazaki's patent.
2) The absolute need of having the envelopes in an open condition, prior to their final use, occupying thereby more shelf an/or floor space.
3) The impossibility to feed them through a printer, copier or any other machine.
4) A removable release liner needs to be applied to the flap of the bottom envelope, to protect it.

U.S. Pat. No. 5,711,477 to Jenkins discloses a sift proof carton that has multiple beads of adhesive. The main disadvantage of this method with respect to the present invention is that it is restricted to industrial use, as the application of the adhesive is performed during the packaging process. In other words, the box can not be built and stored for posterior use, as the adhesive beads are exposed at all times until sealing occurs.

SUMMARY OF THE INVENTION

In accordance with the present invention, a self sealing container comprises a first, second and third surface sections; applying one or more layers of adhesive to the first and/or second surface sections; applying one or more layers of a release substance to the first and/or second surface sections, in such a manner that the adhesive substance layer(s) face the release substance layer(s) on the opposite section, and then positioning of the third section, free of any substance between the first and second sections to seal the container.

The following are objects and advantages of this invention:
a) to provide a container which eliminates the need to moisten coatings of dry glue to seal it, and avoid all the disadvantages of this system;
b) to provide a container which eliminates the need to use opposite coatings of adhesive to seal it and avoid all the disadvantages of this system;
c) to provide a container which eliminates the need to use foreign strips to protect adhesive coatings, to seal it; and all the disadvantages that this system entails, like higher production costs, that naturally translate into higher retail prices, as this foreign strip must be produced separately, and then affixed to the product; and yet another object is to eliminate the need to remove and then discard this foreign strip by the end user;
d) to provide a container that permits an efficient and practical packaging system, in individual or multiple quantities;
e) to provide a container that makes evident any tampering with its sealing;
f) to provide a container whose manufacturing is economical and cost effective;
g) to provide a container that can be readily sealed, without having to use adhesive tape or any other fastening means;
h) to provide a container that can be readily sealed, without having to use heat;
i) to provide a container that can be temporarily closed prior to a more permanent sealing.
j) to provide a container, embodied as an envelope which can be easily fed thorough any type of personal, commercial or industrial printers.

REFERENCE NUMERALS 202 fastener layer
204 optional and alternative lower strength fastener layer
206 fastener inhibitor layer
207 container

DETAILED DESCRIPTION OF THE DRAWINGS

FIGS. 1 through 6B are submitted in abstract form since they relate to all embodiments and combination of embodiments of this invention. These figures illustrate the different layers and different pattern arrangements of the layers that can be implemented to achieve the different fastening effects that enable the production of the multiple embodiments of this invention.

It is to be clearly understood that these pattern arrangements merely represent some examples. Different needs may require different patterns, and accordingly, a specific pattern or combinations of patterns will result obvious within the scope of this invention. As stated before, it is an express and explicit aspect of this application that all the pattern arrangements of FIGS. 2A through 6B and any combination thereof apply to all embodiments of this application, and this is the purpose of their discussion in this specification.

Figure 1:
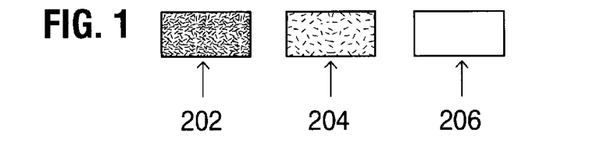
FIG. 1: is a plan view of layers of adhesive, lower strength adhesive and adhesive inhibitor, as respective examples of a fastener, a lower strength fastener and a fastener inhibitor.

REFERRING TO FIG. 1: It shows in plan view a fastener layer 202, which as an example could be a pressure sensitive adhesive; a lower strength fastener layer 204, which as an example could be a low tack pressure sensitive adhesive; and a fastener inhibitor layer 206, which as an example could be a release substance. Properties of fastener layers 202 and fastener inhibitor layers 206 may vary to suit different purposes, including the purpose of removably connecting a fastener layer 202 to a fastener inhibitor layer 206.

Figure 2A:
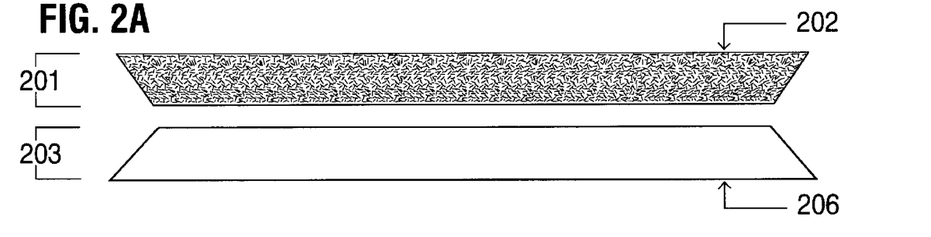
FIG. 2A: is a perspective view of a pattern arrangement of layers on two opposite planes.

REFERRING TO FIG. 2A: It shows in perspective view a singular fastener layer 202 on plane 201, facing a singular fastener inhibitor layer 206 on plane 203. In this and subsequent references, planes 201 and 203 represent a face or surface.

Figure 2B:
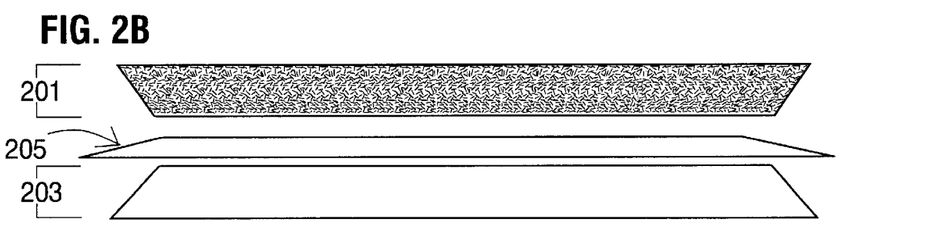
FIG. 2B: is a perspective view of the pattern arrangement of FIG. 2A now having another plane between them.

REFERRING TO FIG. 2B: It shows in perspective view the layers of FIG. 2A, now having a two sided plane 205 free of any layers between planes 201 and 203, that will connect to fastener layer 202 when in contact with it.

Figure 3A:
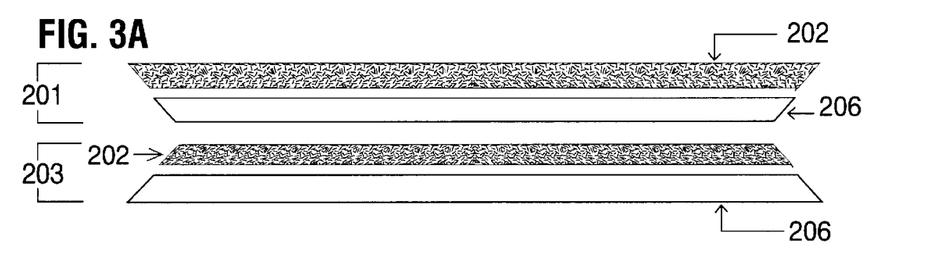
FIG. 3A: is a perspective view of a pattern arrangement of layers on two opposite planes.

REFERRING TO FIG. 3A: It shows in perspective view a fastener layer 202 alternated with a fastener inhibitor layer 206 on plane 201, facing another fastener layer 202 alternated with a fastener inhibitor layer 206 on plane 203, arranged so the fastener layer of one plane face the fastener inhibitor layer of the other plane and vice versa.

Figure 3B:
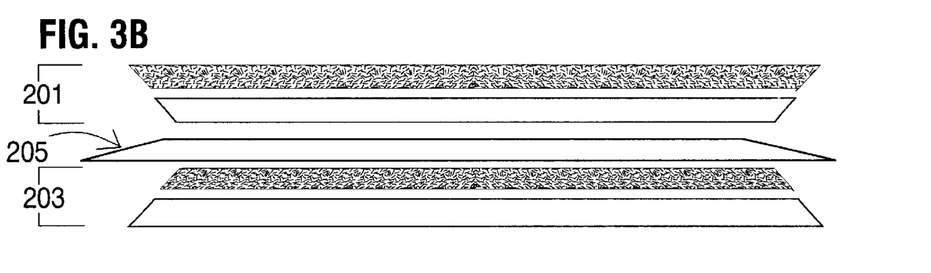
FIG. 3B: is a perspective view of the pattern arrangement of FIG. 3A now having another plane between them.

REFERRING TO FIG. 3B: It shows in perspective view the layers of FIG. 3A, now having a two sided plane 205 free of any layers between planes 201 and 203, that will connect to fastener layers 202 when in contact with them.

Figure 4A:
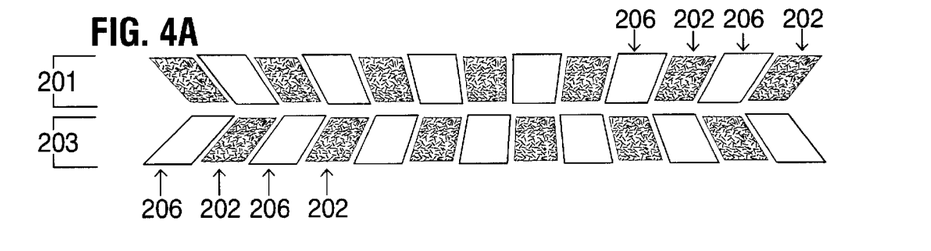
FIG. 4A: is a perspective view of a pattern arrangement of layers on two opposite planes.

REFERRING TO FIG. 4A: It shows in perspective view a sequence of fastener layers 202 alternated with fastener inhibitor layers 206 on plane 201, facing another sequence of fastener layers 202 alternated with fastener inhibitor layers 206 on plane 203, arranged so the fastener layers of one plane face the fastener inhibitor layers of the other plane and vice versa.

Figure 4B:
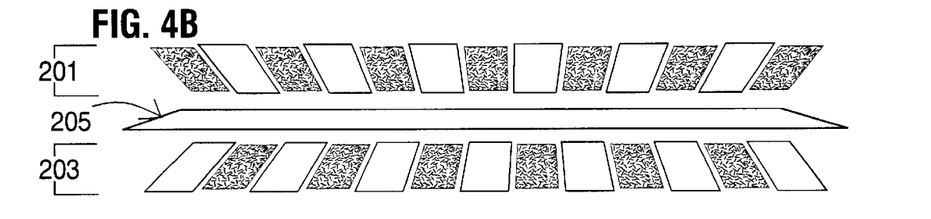
FIG. 4B: is a perspective view of the pattern arrangement of FIG. 4A now having another plane between them.

REFERRING TO FIG. 4B: It shows in perspective view the layers of FIG. 3A, now having a two sided plane 205 free of any layers between planes 201 and 203, that will connect to fastener layers 202 when in contact with them.

Figure 5A:
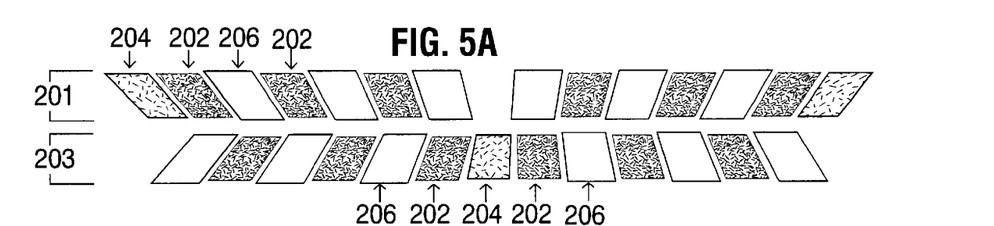
FIG. 5A: is a perspective view of a pattern arrangement of layers on two opposite planes.

REFERRING TO FIG. 5A: It shows in perspective view a sequence of fastener layers 202, alternated with fastener inhibitor layers 206, lower strength fastener layers 204, and a blank space (area with no layer) on plane 201 facing another sequence of fastener layers 202, alternated with fastener inhibitor layers 206, lower strength fastener layers 204 and blank spaces (areas with no layers) on plane 203, arranged so the fastener layers of one plane face the fastener inhibitor layers of the other and vice versa and the lower strength fastener layers of one plane face the blank space(s) of the other and vice versa. A temporary fastening is allowed by the contact of the lower strength fastener layers 204 with the blank spaces.

Figure 5B:
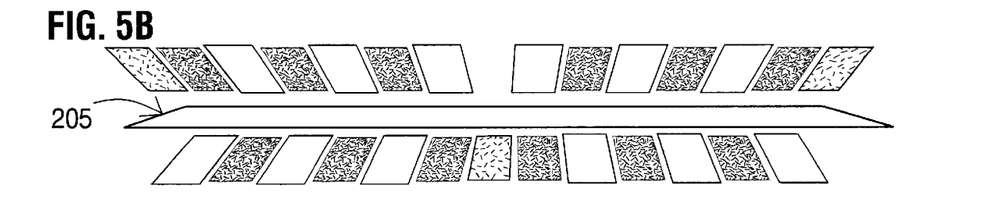
FIG. 5B: is a perspective view of the pattern arrangement of FIG. 5A now having another plane between them.

REFERRING TO FIG. 5B: It shows in perspective view the layers of FIG. 5A, now having a two sided plane 205 free of any layers between planes 201 and 203, that will connect to fastener layers 202 when in contact with them.

Figure 6A:
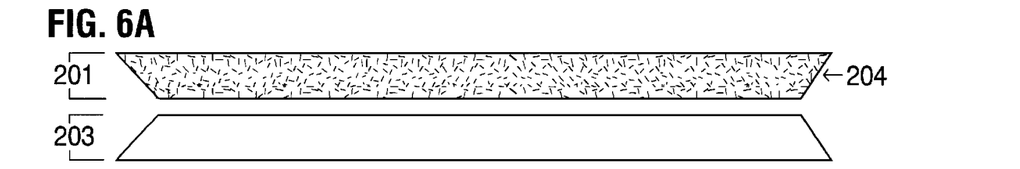
FIG. 6A: is a perspective view of a pattern arrangement of layers on two opposite planes.

REFERRING TO FIG. 6A: It shows in perspective view a lower strength fastener layer 204 on plane 201; facing plane 203, with no layer.

Figure 6B:
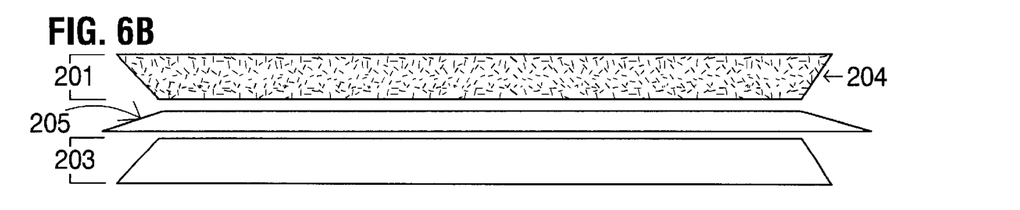
FIG. 6B: is a perspective view of the pattern arrangement of FIG. 6A now having another plane between them.

REFERRING TO FIG. 6B: It shows in perspective view the lower strength fastener layer 204 on plane 201 and no layer on plane 203, and having between them a two sided plane 205 that will temporarily connect to the lower strength fastener layer 204, when it is in contact with it.

The preceding figures are only some illustrative examples. The layers described can have any form, as for instance, curvilinear, zig-zag, etc. and a combination of any forms. They can also be related to any geometrical shape, as for instance, rectangle, triangle, polygon, circle, ellipse, etc, and any combination thereof. Likewise, the layers may be in the periphery of such geometrical shape, and/or the entire area of said geometrical shape. It is further explicitly disclosed as an aspect of this specification that the pattern arrangements illustrated by these figures and corresponding text apply to all the embodiments of this invention.

EMBODIMENT EXAMPLES

It is to be understood that the described and illustrated embodiments merely represent some examples. After applying the principles described, and in combination with the multiple pattern arrangements of layers possible, illustrated with examples of preceding FIGS. 2A through 6B, and any combination thereof, other embodiments and combination of embodiments will result obvious within the scope of this invention. Also, the position of the adhesive layers and adhesive inhibitor layers may be in inverse order in all embodiments. Attributes of adhesive and adhesive inhibitor (e.g. release) substances may vary to suit different fastening needs, as for instance: the need to temporarily connect a coating of adhesive to a coating of adhesive inhibitor.

Closely related embodiment figures have the same number but different alphabetic suffixes.

The terms used in the description of embodiments are intended to be exemplifying, and by no means to be restrictively construed, as obvious equivalents may be applied and substitutions may take place within the scope of the invention.

For instance: "score" or "score lines" are illustrative examples of any means of weakening a sheet material for subsequent folding; "die cut" is an illustrative example of cutting a sheet material into a shape or to remove a shape out of a sheet material; "perforation lines" is an illustrative example of any means of weakening a sheet material for subsequent detachment of a portion thereof.

Also, a fastener is exemplified by an adhesive, and a fastener inhibitor is exemplified by an adhesive inhibitor (e.g. a release substance)

"Sheet material" is any flexible flat material, and includes but is not limited to: paper, cardboard, film, acetate, and the like. A particular mention is hereby made of a product known in the market as "Tyvek™" by Dupont Corp. of Wilmington, Del.; and of another product being commercialized in conventional paper sizes by Xerox Corp. of Rochester, N.Y. under the commercial name "Never Tear Paper" that may be used whenever suitable or desirable.

1st EMBODIMENT EXAMPLE

FIG. 7A through FIG. 7E inclusive illustrate in a progressive manner the application of this invention to produce a self sealing container such as an envelope, making unnecessary the moistening of dry adhesive coatings or the use of foreign liners.

Figures 7A, 7B, 7C, 7D, 8A, 8B, 8C:
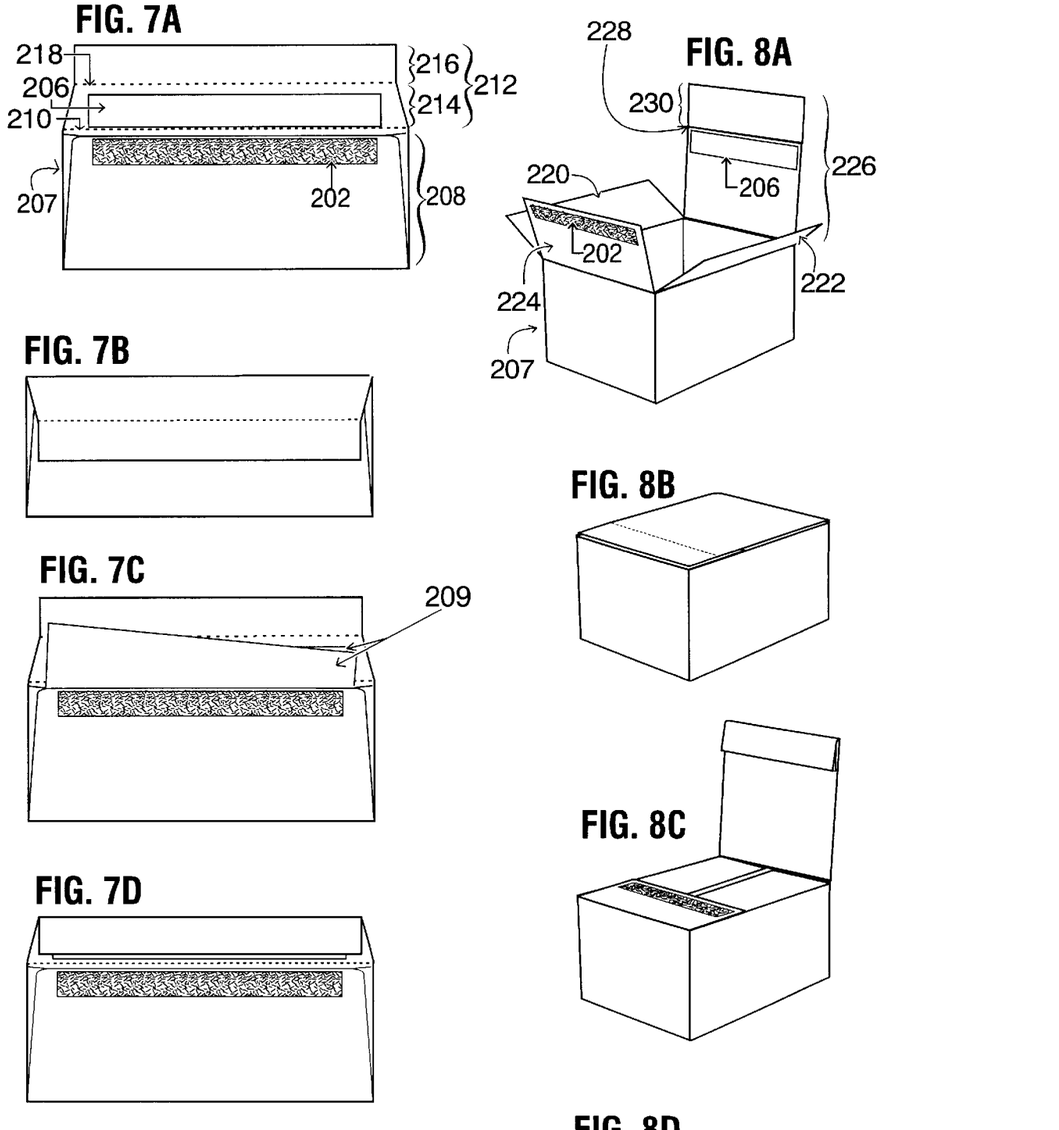
FIG. 7A: is a plan view of an envelope illustrating the layers used.
FIG. 7B: is a plan view of the envelope of FIG. 7A, having the flap bent, and remaining unsealed.
FIG. 7C: is a plan view of the envelope of FIG. 7B, having documents inserted thereto.
FIG. 7D: is a plan view of the envelope of FIG. 7C, illustrating the first step of its sealing.
FIG. 8A: is a perspective view of a carton, illustrating the layers used.
FIG. 8B: is a perspective view of the carton of FIG. 8A, having the flaps bent, and remaining unsealed.
FIG. 8C: is a perspective view of the carton of FIG. 8B, illustrating the first step of sealing.

REFERRING TO FIG. 7A: An envelope 207 is produced so it has a section 208 acting as one of its walls. Across from score line 210 a flap 212 is divided into sections 214 and 216 by score line 218. A layer of adhesive 202 is applied to section 208. A layer of adhesive inhibitor 206 is applied to section 214.

Alternatively, adhesive layers and adhesive inhibitor layers may be applied to both, front wall 208 and section 214, arranged in such a manner that adhesive layers will face adhesive inhibitor layers and vice versa.

REFERRING TO FIG. 7B: Section 212 is bent towards section 208 remaining unattached due to the effect of the adhesive inhibitor. The envelope is now in its pre-use condition, and if desired, can be fed thorough a printer, to print addressing information and/or any desired message.

REFERRING TO FIG. 7C: Documents 209 are being placed into the envelope.

REFERRING TO FIG. 7D: Section 216 is bent towards section 214, as the first step of the sealing of the envelope.

Figure 7E:
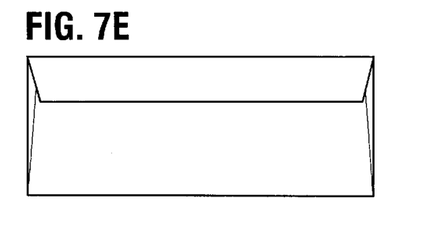
FIG. 7E: is a plan view of the envelope of FIG. 7D, sealed.

REFERRING TO FIG. 7E: Sections 214 and 216, together now, are bent against section 208, sealing the envelope.

An alternate version (not shown) of this and any subsequent container is obtained by omitting the adhesive inhibitor layers 206, and using a dry adhesive substance as the adhesive layers 202 that is activated by its moistening; and for a temporary fastening of the container, a low tack adhesive 204 is used, interacting with a facing surface that has no layer of any substance.

2nd EMBODIMENT EXAMPLE

FIG. 8A through FIG. 8D inclusive illustrate in a progressive manner the application of this invention to produce a self sealing container such as a box or carton, making unnecessary the use of tape or moistening of dry adhesive coatings or the use of foreign protective liners.

REFERRING TO FIG. 8A: A carton 207 is produced so it has inner flaps 220 and 222, outer flaps 224 and 226; adhesive layer 202 and adhesive inhibitor layer (e.g. a release substance) 206 applied to flaps 224 and 226 respectively. Folding line 228 defines section 230 within flap 226.

Alternatively, adhesive layers and adhesive inhibitor layers may be applied to both flaps 224 and 226 and arranged in such a manner that adhesive layers will face adhesive inhibitor layers and vice versa.

REFERRING TO FIG. 8B: Inner flaps 220 and 222 have been bent towards interior of container. Flap 224 was bent over inner flaps, and lastly flap 226 was bent over flap 224, whereby, adhesive layer and adhesive inhibitor layers entered in contact to one another, and remain removably fastened.

REFERRING TO FIG. 8C: Flap 226 is lifted, section 230 is bent over flap 226, so it now covers the layer of adhesive inhibitor.

Figure 8D:
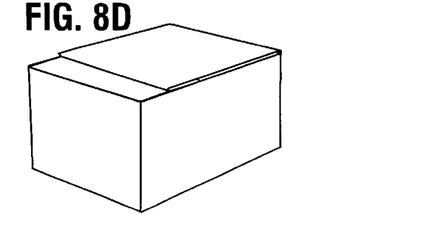
FIG. 8D: is a perspective view of the carton of FIG. 8C, sealed.

REFERRING TO FIG. 8D: Flap 226 is bent towards the carton; section 230 enters in contact with the adhesive layer, sealing the carton.

3rd EMBODIMENT EXAMPLE

FIG. 9A through FIG. 9D inclusive illustrate in a progressive manner the application of this invention to produce a self sealing container such as an envelope, making unnecessary the use of tape or moistening of dry adhesive coatings or the use of foreign liners, or adhesive tape.

Figure 9A:
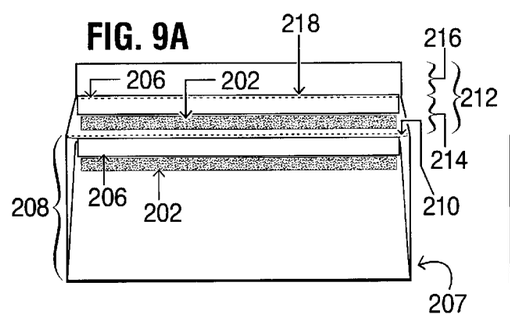
FIG. 9A: is a plan view of an envelope illustrating the layers used.

REFERRING TO FIG. 9A: An envelope 207 is produced so it has a section 208 acting as one of its walls. Across from score line 210 a flap 212 is divided into sections 214 and 216 by score line 218. A layer of adhesive 202 and a layer of adhesive inhibitor 206 are applied to section 208. A Layer of adhesive 202 and a layer of adhesive inhibitor 206 are applied to section 214.

Figure 9B:
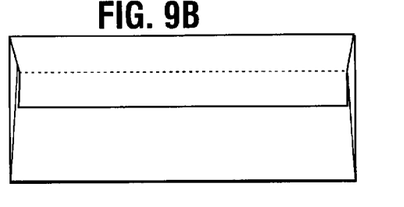
FIG. 9B: is a plan view of the envelope of FIG. 9A, having the flap bent, and remaining unsealed.

REFERRING TO FIG. 9B: Section 212 is bent towards section 208 remaining unattached due to the effect of the adhesive inhibitor. The envelope is now in its pre-use condition, and if desired, can be fed thorough a printer to print address or any other information.

Figure 9C:
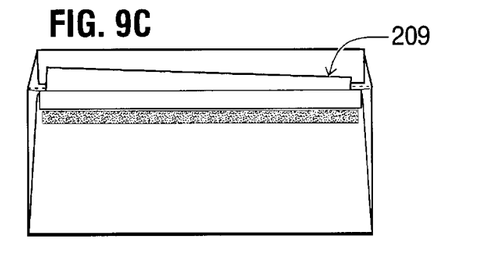
FIG. 9C: is a plan view of the envelope of FIG. 9B, having flap folded as first step of sealing, and having documents inserted thereto.

REFERRING TO FIG. 9C: Section 216 is bent towards section 214, connecting to it. A document 209 is being placed into the envelope.

Figure 9D:
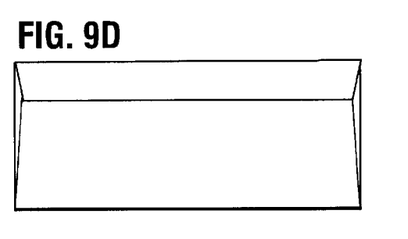
FIG. 9D: is a plan view of the envelope of FIG. 9C, sealed.

REFERRING TO FIG. 9D: Folded section 212 is bent towards section 208, sealing the envelope.

4th EMBODIMENT EXAMPLE

FIG. 10A through FIG. 10D inclusive illustrate in a progressive manner the application of this invention to produce a self sealing container such as an envelope, making unnecessary the use of tape or moistening of dry adhesive coatings or the use of foreign liners.

Figure 10A:
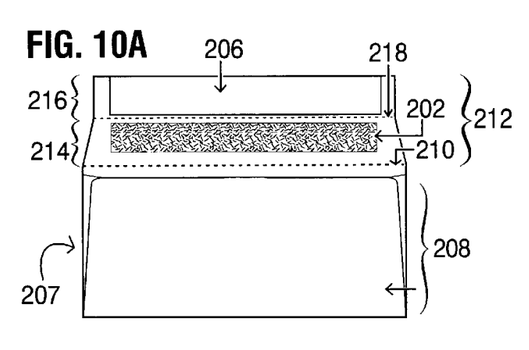
FIG. 10A: is a plan view of an envelope illustrating the layers used.

REFERRING TO FIG. 10A: An envelope 207 is produced so it has a section 208 acting as one of its walls. Across from score line 210 a flap 212 is divided into sections 214 and 216 by score line 218. A layer of adhesive inhibitor 206 is applied to section 216. A Layer of adhesive 202 is applied to section 214.

Figure 10B:
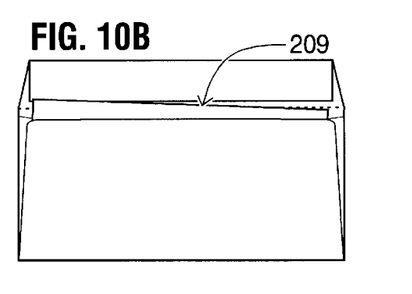
FIG. 10B: is a plan view of the envelope of FIG. 10A, having flap folded as first step of sealing, and having documents inserted thereto.

REFERRING TO FIG. 10B: Section 216 is bent towards section 214, connecting to it temporarily. A document 209 is being placed into the envelope.

Figure 10C:
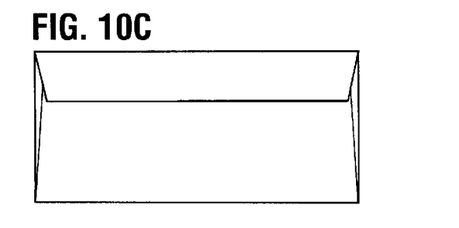
FIG. 10C: is a plan view of the envelope of FIG. 10B, unsealed.

REFERRING TO FIG. 10C: Folded section 212 is bent towards section 208, defining the condition of the envelope before use. If desired, envelope can be fed thorough a printer.

Figure 10D:
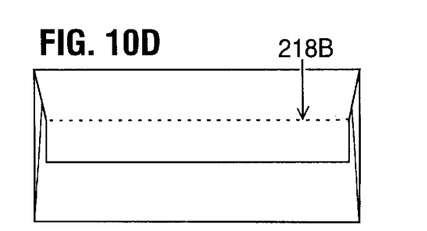
FIG. 10D: is a plan view of the envelope of FIG. 10C, sealed.

REFERRING TO FIG. 10D: Section 212 is unfolded and placed in contact with section 208, sealing the envelope.

Score line 218 might optionally be replaced by a perforation line 218B, for discretionary detachment of section 216.

5th EMBODIMENT EXAMPLE

FIG. 11A through FIG. 11E inclusive illustrate in a progressive manner the application of this invention to produce a self sealing container such as an envelope, making unnecessary the use of tape or moistening of dry adhesive coatings or the use of foreign liners.

Figure 11A:
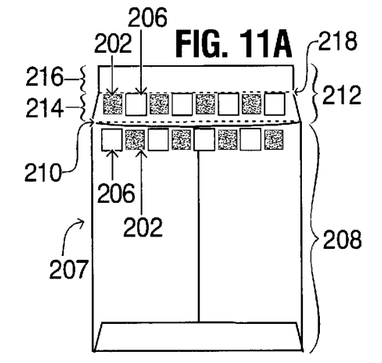
FIG. 11A: is a plan view of an envelope illustrating the layers used.

REFERRING TO FIG. 11A: An envelope 207 is produced so it has a section 208 acting as one of its walls. Across from score line 210 a flap 212 is divided into sections 214 and 216 by score line 218. Layers of adhesive 202 and layers of adhesive inhibitor 206 are applied to section 208. Layers of adhesive 202 and layers of adhesive inhibitor 206 are applied to section 214.

Figure 11B:
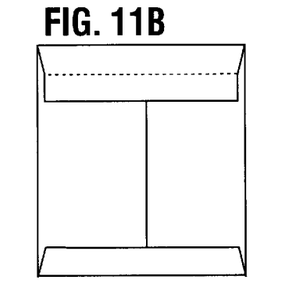
FIG. 11B: is a plan view of the envelope of FIG. 11A, having the flap bent, remaining unsealed.

REFERRING TO FIG. 11B: Section 212 is bent towards section 208 remaining unattached due to the effect of the adhesive inhibitor. The envelope is now in its pre-use condition, and if desired, can be fed through a printer.

Figure 11C:
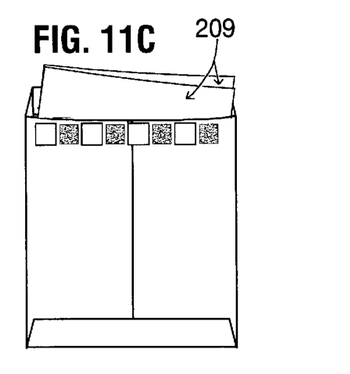
FIG. 11C: is a plan view of the envelope of FIG. 11B, having documents inserted thereto.

REFERRING TO FIG. 11C: Section 216 is bent towards section 214, connecting to it. Documents 209 are being placed into the envelope.

Figures 11D, 11E, 12A, 12B, 12C, 13:
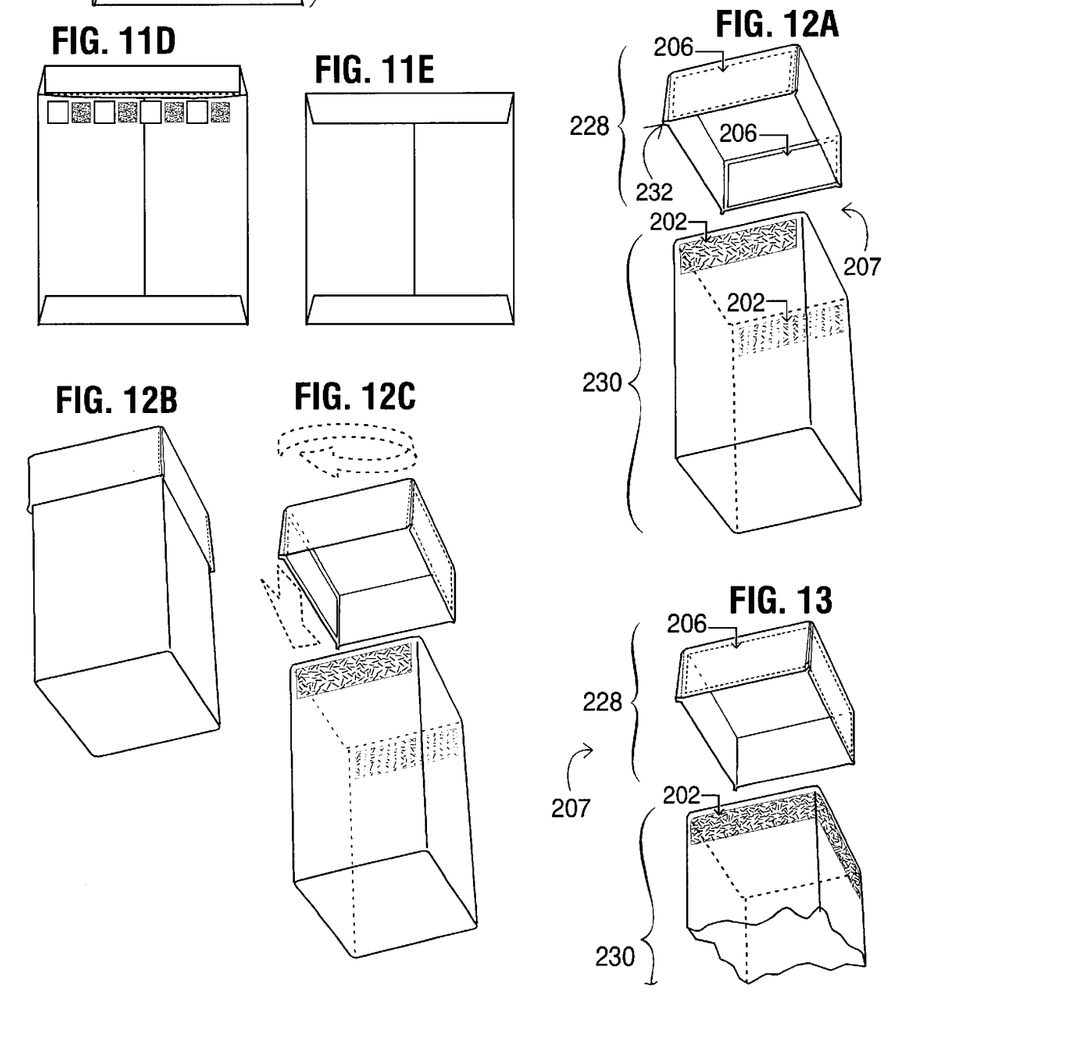
FIG. 11D: is a plan view of the envelope of FIG. 11C, having flap folded as first step of sealing.
FIG. 11E: is a plan view of the envelope of FIG. 11D, sealed.
FIG. 12A: is an exploded perspective view of a shipping tube.
FIG. 12B: is a perspective view of the shipping tube of FIG. 12A, in closed, yet unsealed condition.
FIG. 12C: is an exploded perspective view of the shipping tube of FIG. 12B, illustrating the rotation and motion of the parts for sealing.
FIG. 13: is an exploded partial view of a shipping tube.

REFERRING TO FIG. 11D: Section 216 is bent towards section 214, connecting to it.

REFERRING TO FIG. 11E: Folded section 212 is bent against front wall, sealing the envelope.

6th EMBODIMENT EXAMPLE

FIG. 12A through FIG. 12C inclusive illustrate in a progressive manner the application of this invention to produce a self sealing container such as a shipping tube. The tube shown has a parallelepiped shape. It could have any regular or irregular shape, including of course a conventional cylinder.

REFERRING TO FIG. 12A: A shipping tube 207 has a top portion (lid) 228 and a bottom portion (receptacle) 230. Optionally, corners 232 of the top portion are protruded and shaped as bellows, to provide added flexibility. Adhesive inhibitor layers 206 are applied to the inner surface of two of the four side panels of the top portion. (Some lines appear as ghost lines, since they are on the inner side, and hence, otherwise non-visible in this view.) Adhesive layers 202 are applied to the outer side of two of the four side panels of the bottom portion. (Some parts appear in ghost lines.) Layers of adhesive inhibitor of top portion are on the same sides of layers of adhesive of bottom portion.

REFERRING TO FIG. 12B: Bottom portion is inserted into top portion, temporarily connecting to it by the contact of adhesive layers and adhesive inhibitor layers. Container is closed, yet unsealed.

REFERRING TO FIG. 12C: Dotted arrows indicate the rotation and positioning of the top portion with respect to the bottom portion, to seal the shipping tube.

REFERRING TO FIG. 13: An alternate version of this embodiment is summarily shown. The receptacle 230 is shown in cut/partial view. (Reference numerals are the same of FIG. 12A.) A single layer of adhesive 202 in a continuous fashion is applied to half the number of panels of the receptacle (2 panels), and a single layer of adhesive inhibitor 206 in a continuous fashion is applied to half the number of panels of the lid, (2 panels) in such a manner that when the lid is in contact with the receptacle, the adhesive layer 202 will removably connect to the adhesive inhibitor layer 206. To close the container in a permanent fashion, the lid is removed, rotated and mated with the receptacle, so the adhesive layer enters in contact with an area free of adhesive inhibitor layer on the receptacle. Of course, in this as in all the other embodiments, the pattern arrangements described with FIGS. 2A through 6B will enable other embodiment variations.

7th EMBODIMENT EXAMPLE

FIG. 14A through FIG. 14D inclusive illustrate in a progressive manner the application of this invention to produce a self sealing container such as a box, whose features further act as a security seal that would make evident any tampering with the packaging.

Figure 14A:
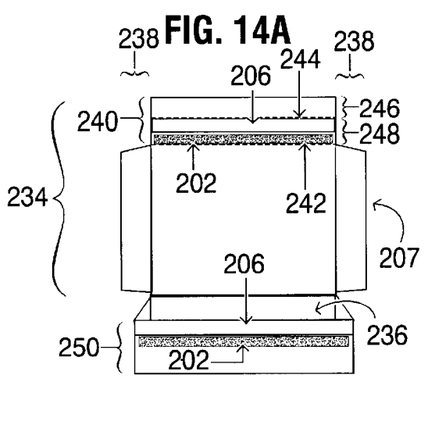
FIG. 14A: is a front isometric view of a box, illustrating the layers used.

REFERRING TO FIG. 14A: A box 207 is produced so it has a lid 234, and a container 236. The lid has two side flaps 238 and a front flap 240, defined by score line 242. The front flap is divided by score line 244 into sections 246 and 248. An adhesive layer 202 and an adhesive inhibitor layer 206 are applied to section 248. The container 236 has a front or inner wall 250, which has a layer of adhesive 202 and a layer of adhesive inhibitor 206 on its upper half.

Figure 14B:
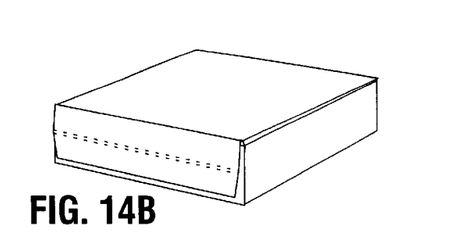
FIG. 14B: is a perspective view of the box of FIG. 14A, having the lid against container, and remaining unsealed.

REFERRING TO FIG. 14B: The lid is folded towards container remaining section 248 unattached to the adhesive layers on wall 250 by the effect of the adhesive inhibitor layers, establishing thereby the configuration of the box before its use.

Figure 14C:
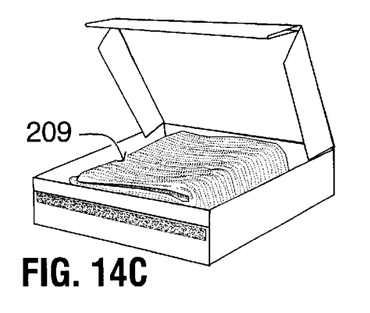
FIG. 14C: is a perspective view of the box of FIG. 14B, having an article inserted, and illustrating the first step of sealing.

REFERRING TO FIG. 14C: The side flaps are bent, so they are oriented towards the inside of the container. Section 246 is bent, so it attaches to adhesive layers on section 248. An article 209 was inserted into the box.

Figure 14D:
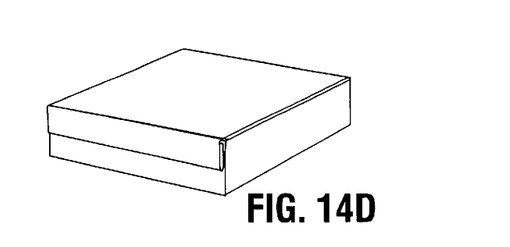
FIG. 14D: is a perspective view of the box of FIG. 14C, sealed.

REFERRING TO FIG. 14D: The lid is bent towards container, so side flaps are fully inside it, back side of section 246 is applied against front panel so it attaches to adhesive layers, sealing the box.

8th EMBODIMENT EXAMPLE

FIG. 15A through FIG. 15D inclusive illustrate in a progressive manner the application of this invention to produce a self sealing container such as a box, whose features further act as a security seal that would make evident any tampering with the packaging.

Figure 15A:
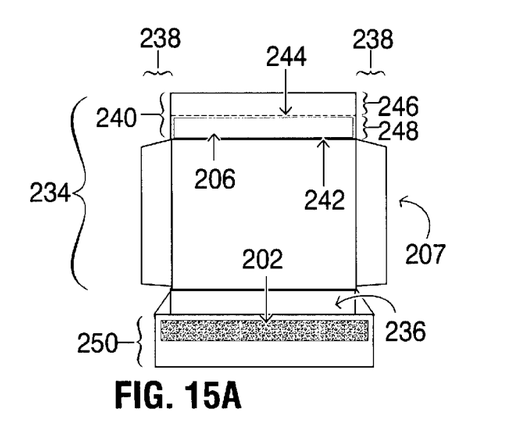
FIG. 15A: is a front isometric view of a box, illustrating the layers used.

REFERRING TO FIG. 15A: A box 207 is produced so it has a lid 234, and a container 236. The lid has two side flaps 238 and a front flap 240, defined by score line 242. The front flap is divided by score line 244 into sections 246 and 248. An adhesive inhibitor layer 206 is applied to section 248. The container 236 has a front or inner wall 250, which has a layer of adhesive 202 on its upper half.

Figure 15B:
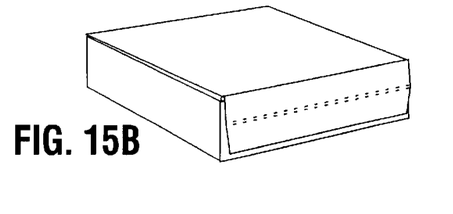
FIG. 15B: is a perspective view of the box of FIG. 15A, having the lid against container, and remaining unsealed.

REFERRING TO FIG. 15B: The lid is folded towards container remaining section 248 unattached to the adhesive layers on wall 250 by the effect of the adhesive inhibitor layer, establishing thereby the configuration of the box before its use.

Figure 15C:
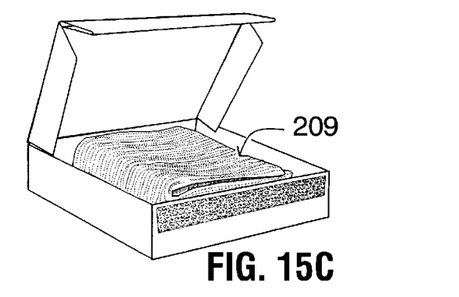
FIG. 15C: is a perspective view of the box of FIG. 15B, having an article inserted, and illustrating the first step of sealing.

REFERRING TO FIG. 15C: The side flaps are bent, so they are oriented towards the inside of the container. Section 246 is bent. An article 209 was inserted into the box.

Figure 15D:
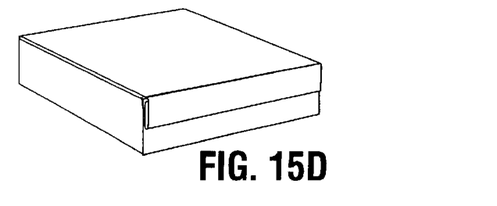
FIG. 15D: is a perspective view of the box of FIG. 15C, sealed.

REFERRING TO FIG. 15D: The lid is bent towards container, so side flaps are fully inside it, back side of section 246 is applied against front panel so it attaches to the adhesive layer, sealing the box.

9th EMBODIMENT EXAMPLE

Figure 16A:
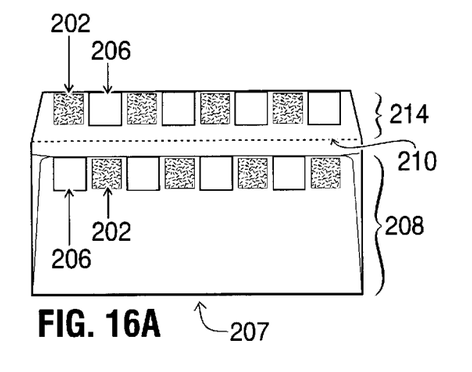
FIG. 16A: is a plan view of an envelope, illustrating the layers used.
Figure 16B:
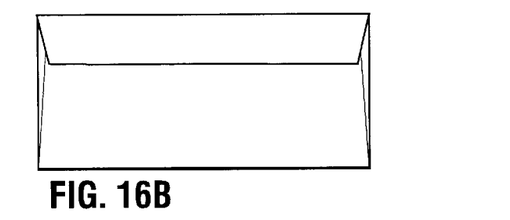
FIG. 16B: is a plan view of the envelope of FIG. 16A, having its flap bent, and remaining unsealed.
Figure 16C:
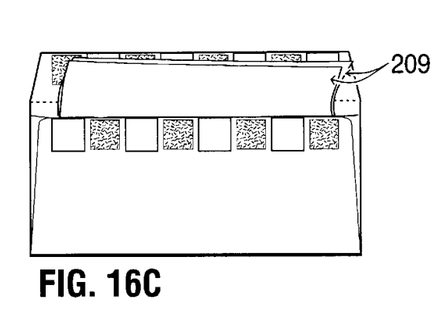
FIG. 16C: is a plan view of the envelope of FIG. 16B, having documents inserted thereto.
Figure 16D:
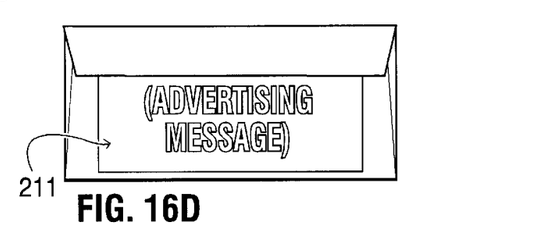
FIG. 16D: is a plan view of the envelope of FIG. 16C: having a sheet positioned between flap and front panel, sealing the envelope.

FIG: 16A through FIG. 16D inclusive illustrate in a progressive manner the application of this invention to produce a self sealing container, such as an envelope, and also having an article attached thereto.

REFERRING TO FIG. 16A: An envelope 207 is produced so it has a surface 208, acting as one of its walls, and a flap 214 across score line 210. A sequence of adhesive layers 202 alternated by adhesive inhibitor layers 206 is applied to the flap and a similar sequence is applied to a marginal portion of surface 208.

REFERRING TO FIG. 16B: Flap is bent towards section 208, removably connecting to it, since adhesive layers face adhesive inhibitor layers.

REFERRING TO FIG. 16C: Documents 209 are being inserted into the envelope.

REFERRING TO FIG. 16D: An article 211 (a message bearing sheet, in this case) is positioned between flap and section 208, sealing the envelope.

10th EMBODIMENT EXAMPLE

FIG. 17A through FIG. 17D inclusive illustrate in a progressive manner the application of this invention to produce a self sealing container, such as an envelope, and also having an advertising message inserted thereto.

Figure 17A:
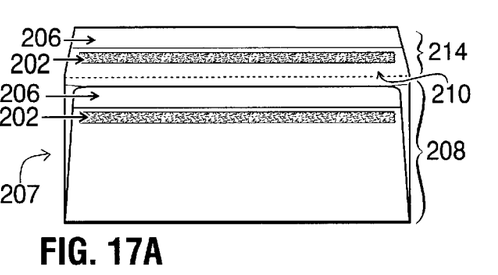
FIG. 17A: is a plan view of an envelope, illustrating the layers used.

REFERRING TO FIG. 17A: An envelope 207 is produced so it has a surface 208, acting as one of its walls, and a flap 214 across score line 210. An adhesive layer 202 and an adhesive inhibitor layer 206 are applied to the flap; an adhesive layer 202 and an adhesive inhibitor layer 206 are applied to a marginal portion of section 208, in such arrangement that adhesive inhibitor of flap faces adhesive of section 208 and vice versa, when the flap is bent against section 208.

Figure 17B:
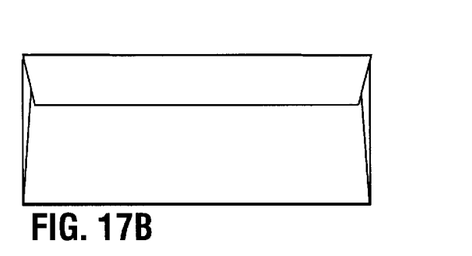
FIG. 17B: is a plan view of the envelope of FIG. 17A, having its flap bent, and remaining unsealed.

REFERRING TO FIG. 17B: Flap is bent towards section 208, removably connecting to it, since adhesive layers face adhesive inhibitor layers.

Figure 17C:
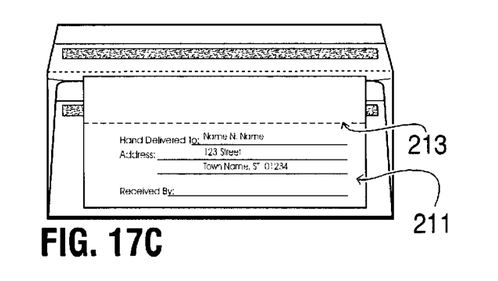
FIG. 17C: is a plan view of the envelope of FIG. 17B, having a sheet mounted thereto.

REFERRING TO FIG. 17C: Document(s) have already being inserted into the envelope. An article 211, (a receipt in this case) is positioned against section 208. Receipt may optionally have detachment line 213.

Figure 17D:
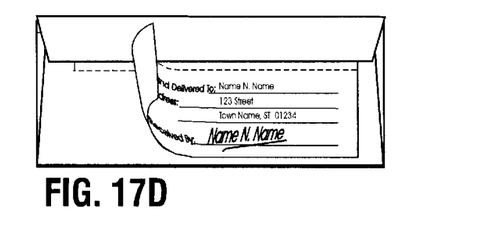
FIG. 17D: is a plan view of the envelope of FIG. 17C, having flap bent, sealing the envelope, and sheet being detached.

REFERRING TO FIG. 17D: Flap has been bent against receipt, sealing the envelope. A signature was collected in the receipt. Receipt is being detached.

11th EMBODIMENT EXAMPLE

Figure 18A:
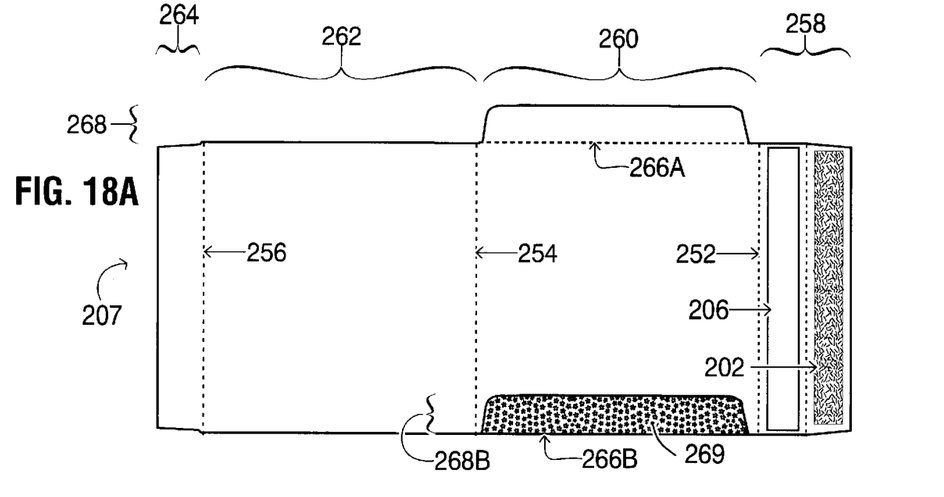
FIG. 18A: is a plan view of a disassembled envelope, illustrating the layers used.
Figure 18B:
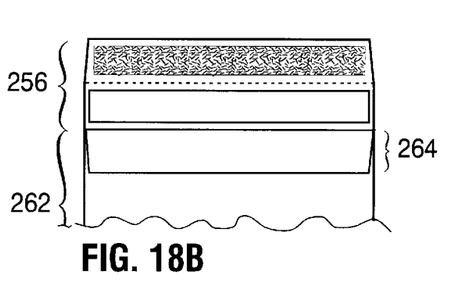
FIG. 18B: is a partial plan view of the envelope of FIG. 18A.
Figure 18C:
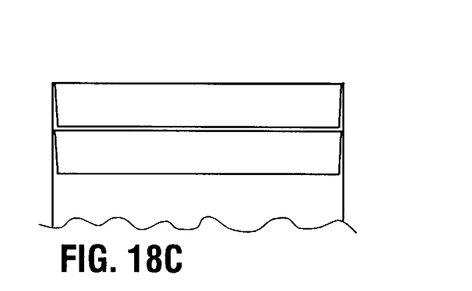
FIG. 18C: is a partial plan view of the envelope of FIG. 18B, showing the envelope in the condition it is sold.
Figure 18D:
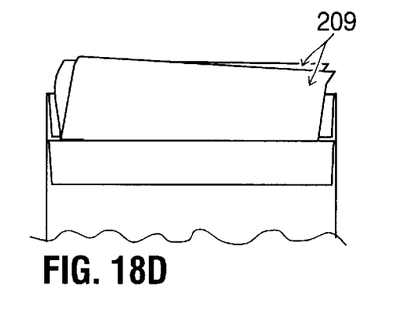
FIG. 18D: is a partial quasi-plan view of the envelope of FIG. 18C, having documents inserted thereto.
Figure 18E:
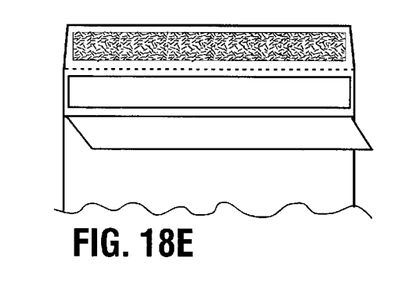
FIG. 18E: is a partial isometric view of the envelope of FIG. 18D, in process of being sealed.
Figure 18F:
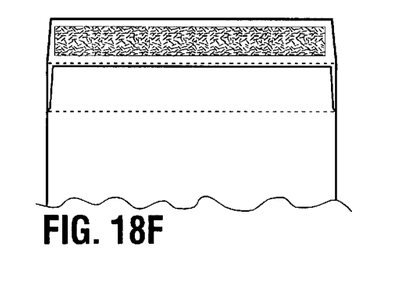
FIG. 18F: is a partial isometric view of the envelope of FIG. 18E, in a later stage of its sealing process.
Figure 18G:
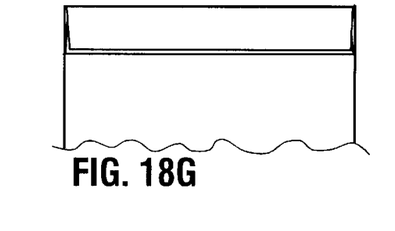
FIG. 18G: is a partial isometric view of the envelope of FIG. 18E, fully sealed.

FIG: 18A through FIG. 18G inclusive illustrate in a progressive manner the application of this invention to produce a self sealing container, such as an envelope.

REFERRING TO FIG. 18A: An envelope 207 is shown prior to assembly, having score lines 252, 254 and 256; defining first flap 258, back wall 260, front wall 262 and second flap 264; and accross score lines 266A and 266B, respectively, supporting flaps 268 and 268B. Flap 268B is in bent condition, so it shows its back side carrying building adhesive 269. A layer of adhesive 202 and a layer of adhesive inhibitor 206 are applied to first flap.

REFERRING TO FIG. 18B: This figure shows in a partial plan view the envelope 207, rotated 90° with respect to FIG. 18A, after it was assembled, and showing flap 264 outwardly bent and resting on front wall 262.

REFERRING TO FIG. 18C: First flap has been bent.

REFERRING TO FIG. 18D: Documents 209 are being inserted into envelope.

REFERRING TO FIG. 18E: Documents are fully inside envelope. First flap was unbent. Second flap is being lifted.

REFERRING TO FIG. 18F: Second flap is being positioned in contact with first flap.

REFERRING TO FIG. 18G: First flap is bent so adhesive enters in contact with second flap, sealing the envelope.

I claim:

1. A self sealing container, comprising:
   a) a first and a second surface section,
   b) a third surface section, having a first side and a second side,
   c) at least one layer of adhesive and at least one layer of adhesive inhibitor applied to each of said first and second surface sections, in such a manner that when said first and second surface sections are in contact with one another, said at least one layer of adhesive faces said at least one layer of adhesive inhibitor,
   whereby said first and second surface sections can be removably connected to one another, and
   when said first and second surface sections are respectively in contact with said first and second sides of said third surface section, said self sealing container is sealed.

2. The self sealing container of claim 1), wherein said self sealing container is a self sealing envelope.

3. The self sealing container of claim 1), wherein said self sealing container is a self sealing box.

4. The self sealing container of claim 1), wherein said self sealing container is a self sealing carton.

5. A self sealing container, comprising:
   a) two surface sections, wherein one of said two surface sections is a closure flap and the other one of said two surface sections is a front wall,
   b) at least one layer of adhesive and at least one layer of adhesive inhibitor applied to each of said two surface sections, in such a manner that when said two surface sections are in contact with one another, each layer of adhesive faces one of said layers of adhesive inhibitor, whereby said two surfaces can be removably connected to one another,
   c) at least one article that when is positioned between said two surface sections permits the sealing of said self sealing container.

6. The self sealing container of claim 5), wherein said self sealing container is a self sealing envelope.

7. The self sealing container of claim 5), wherein said self sealing container is a self sealing box.

8. The self sealing container of claim 5), wherein said self sealing container is a self sealing carton.

9. The self sealing container of claim 5), wherein said adhesive is pressure sensitive adhesive and said adhesive inhibitor is a release substance.

10. The self sealing container of claim 5), wherein said at least one article is a piece of a sheet material.

11. A self sealing container, comprising:
    a) two mating components, wherein one of said two mating components functions as a receptacle, and the other one of said two mating components functions as a lid,
    b) at least one layer of a fastener applied to each of said two mating components,
    c) at least one layer of a fastener inhibitor applied to each of said two mating components, arranged in such a manner that when said two mating components are in an initial mating condition, said at least one layer of a fastener is in contact with said at least one layer of a fastener inhibitor,
    whereby said two mating components are temporarily fastened, and when said two mating components are positioned in a final mating condition, said at least one fastener layer avoids said at least one fastener inhibitor layer, permitting the sealing of said self sealing container.

12. The self sealing container of claim 11), wherein said fastener is adhesive and said fastener inhibitor is a release substance.

13. The self sealing container of claim 11), wherein said self sealing container is made of cardboard.

14. The self sealing container of claim 11), wherein said self sealing container is made of plastic.

15. The self sealing container of claim 11), wherein one of said two mating components has flexing means to further facilitate contact with the other one of said two mating components.

16. A self sealing container, comprising:
    a) a first flap, having at least one layer of adhesive and at least one layer of an adhesive inhibitor, arranged in such a manner that when said flap is bent, said at least one layer of adhesive enters in contact with said at least one layer of an adhesive inhibitor,
    b) a second flap, that permits the sealing of said self sealing container when said second flap is positioned between said at least one layer of adhesive and said at least one layer of an adhesive inhibitor of said first flap.

17. The self sealing container of claim 16), wherein said adhesive is pressure sensitive adhesive and said adhesive inhibitor is a release substance.

18. The self sealing container of claim 16), wherein said self sealing container is an envelope.

19. The self sealing envelope of claim 18), wherein said adhesive is pressure sensitive adhesive and said adhesive inhibitor is a release substance.

20. A self sealing container, comprising:
    a) a front wall and a flap, said front wall having a front side and a back side, wherein said front side is on the outside of said container,
    b) said front side comprising a coating of adhesive applied thereto,
    c) said flap comprising a first section and a second section,
    d) said second section comprising a coating of adhesive inhibitor applied thereto, wherein said flap can be in either an unfolded condition or in a folded condition, so when said flap is in the unfolded condition and brought in contact with said front wall, said coating of adhesive inhibitor faces said coating of adhesive, whereby a permanent sealing of the envelope is prevented, and when said flap is in the folded condition and brought in contact to said front side of said front wall, said container is sealed.

21. The self sealing container of claim 20), wherein said adhesive is pressure sensitive adhesive and said adhesive inhibitor is a release substance.

22. The self sealing container of claim 20), wherein said self sealing container is a self sealing envelope.

23. The self sealing envelope of claim 22), wherein said adhesive is pressure sensitive adhesive and said adhesive inhibitor is a release substance.

24. The self sealing container of claim 20), wherein said self sealing container is a self sealing box.

25. The self sealing box of claim 24), wherein said adhesive is pressure sensitive adhesive and said adhesive inhibitor is a release substance.

26. A self sealing envelope, comprising:
    a) a container section and
    b) a closure flap,
    said container section comprising a closure wall, said closure wall comprising an adhesive coated area,
    said closure flap having a front side and a back side,
    said closure flap being foldable,
    said front side comprising a blank area and an adhesive inhibitor coated area, so when said closure flap is unfolded and in an initial contact with said closure wall, said front side of said closure flap is in contact with said closure wall, whereby
    said self sealing envelope is closed in a temporary fashion,
    and after folding said closure flap and said back side of said closure flap is placed in contact with said closure wall, said self sealing envelope is closed in a permanent fashion.

27. The self sealing envelope of claim 26), wherein said adhesive is pressure sensitive adhesive and said adhesive inhibitor is a release substance.

28. The self sealing envelope of claim 6), wherein said adhesive is pressure sensitive adhesive and said adhesive inhibitor is a release substance.

* * * * *